(12) United States Patent
Wu et al.

(10) Patent No.: US 6,764,757 B1
(45) Date of Patent: Jul. 20, 2004

(54) RECORDING MEDIUM WITH A LUBRICATING LAYER HAVING INCREASED THERMAL STABILITY

(75) Inventors: Mei-Ling Wu, Cranberry Township, PA (US); James Dillon Kiely, Sewickley, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 180 days.

(21) Appl. No.: 09/901,802

(22) Filed: Jul. 10, 2001

Related U.S. Application Data (60) Provisional application No. 60/217,235, filed on Jul. 10, 2000.

(51) Int. Cl.$^7$ .................................................. G11B 5/72
(52) U.S. Cl. ................. 428/336; 428/408; 428/694 TP; 428/694 TC
(58) Field of Search .......................... 428/408, 694 TP, 428/694 TC, 336

(56) References Cited

U.S. PATENT DOCUMENTS

| | | | |
|---|---|---|---|
| 4,693,799 A | | 9/1987 | Yanagihara et al. |
| 4,761,334 A | | 8/1988 | Sagoi et al. |
| 4,880,687 A | | 11/1989 | Yokoyama et al. |
| 4,925,733 A | | 5/1990 | Imataki et al. |
| 5,132,173 A | | 7/1992 | Hashimoto et al. |
| 5,266,409 A | * | 11/1993 | Schmidt et al. ............. 428/446 |
| 5,674,638 A | | 10/1997 | Grill et al. |
| 5,873,984 A | | 2/1999 | Cheng et al. |
| 6,468,642 B1 | * | 10/2002 | Bray et al. .................. 428/216 |

FOREIGN PATENT DOCUMENTS

JP      2001195723 A    *    7/2001

OTHER PUBLICATIONS

Kazuhiko Endo et al., "Nitrogen doped fluorinated amorphous carbon thin films grown by plasma enhanced chemical vapor deposition for low dielectric constant interlayer dielectrics", *Appl. Phys. Lett.*, Jun. 17, 1996, pp. 3656–3658, vol. 68, No. 25.

T.E. Karis et al., "Ellipsometric measurement of solid fluorocarbon film thickness on magnetic recording media", *J. Appl. Phys.*, Apr. 15, 1997, pp. 5378–5380, vol. 81, No. 8.

T.E. Karis et al., "Characterization of a solid fluorocarbon film on magnetic recording media", *J. Vac. Sci. Technol.*, Jul./Aug. 1997, pp. 2382–2387, vol. 15, No. 4.

T. E. Karis et al., "Tribology of a Solid Fluorocarbon Film on Magnetic Recording Media", *IEEE Transactions on Magnetics*, Jul. 1998, pp. 1747–1749, vol. 34, No. 4.

J. Lubguban Jr. et al., "Thermal stability and breakdown strength of carbon–doped $SiO_2$:F films prepared by plasma–enhanced chemical vapor deposition method", *Journal of Applied Physics*, Apr. 15, 2000, pp. 3715–3722, vol. 87, No. 8.

* cited by examiner

*Primary Examiner*—Stevan A. Resan
(74) *Attorney, Agent, or Firm*—Alan G. Towner, Esq.; Pietragallo, Bosick & Gordon (57) ABSTRACT

The present invention provides a recording medium having a solid lubricating layer that has increased thermal stability over traditional solid lubricants. The lubricating layer includes amorphous fluorinated carbon doped with a thermally stabilizing dopant, such as N or $SiO_2$. In one embodiment, a method of lubricating the recording medium by plasma-enhanced chemical vapor deposition is also provided.

30 Claims, 5 Drawing Sheets

RECORDING MEDIUM WITH A LUBRICATING LAYER HAVING INCREASED THERMAL STABILITY

CROSS-REFERENCE TO RELATED APPLICATION

This application claims the benefit of U.S. Provisional Application Serial No. 60/217,235 filed Jul. 10, 2000, which is incorporated herein by reference.

BACKGROUND INFORMATION

Most modern information storage systems depend on magnetic recording due to its reliability, low cost, and high storage capacity. The primary elements of a magnetic recording system are the recording medium and the read/write head. Magnetic discs with magnetizable media are used for data storage in almost all computer systems.

In order to maximize storage density on the disc, the flying height between the read/write head and the medium should be minimized. Current magnetic hard disc drives operate with the read/write heads only a few nanometers above the disc surface and at rather high speed, typically a few meters per second. Because the read/write heads can contact the disc surface during operation, a thin layer of lubricant is coated on the disc surface to reduce wear and friction.

Amorphous fluorinated carbon (a-C:F,H) is known for some unique properties such as chemical inertness, good electrical stability, low surface energy and low dielectric constant. It has shown significant superiority in corrosion resistance over the traditional hydrogenated carbon (a-C:H) produced by sputtering and ion beam deposition. Further, a-C:F,H has provided a lower coefficient of friction between the read/write head and the recording medium. The lower coefficient of friction indicates increased wear resistance of the lubricant layer. Lubricants comprising a-C:F,H are disclosed in U.S. Pat. application Ser. No. 09/870,685 filed Jun. 1, 2001, entitled "CORROSION RESISTANT OVERCOAT FOR A COMPONENT OF A RECORDING DEVICE," the entire contents of which are hereby incorporated by reference.

One problem with the use of a-C:F,H as a solid lubricant arises in the context of thermally or optically assisted magnetic recording. Using a laser beam in association with a writing method for magnetic media can achieve high performance, high density and extended lifetime in data storage applications. However, under laser irradiation, the local temperature generally can rise to temperatures such as 200 to 300° C. It has been observed in thermal modeling that the lubricant layer can easily reach a peak temperature of 200° C. or higher. The thermal stability of conventional a-C:F,H is not sufficient to withstand such temperatures. It has been observed that the dielectric constant of conventional a-C:F,H films begins to change at approximately 250° C. which indicates the film is beginning to degrade. The conventional lubricating layers for magnetic recording are substantially vaporized at 300° C. As a result of the lubricant layer degrading and vaporizing, premature wear of the recording medium, as well as the read/write head may occur.

Therefore, there exists a need for a lubricant layer that shows thermal stability at the high temperatures produced by thermally or optically assisted magnetic recording, while maintaining good wear resistance.

SUMMARY OF THE INVENTION

In accordance with an embodiment of the present invention, a recording medium is provided comprising a substrate, a recording layer disposed on the substrate and a lubricating layer disposed on the recording layer. The lubricating layer comprises fluorinated carbon and a thermally stabilizing dopant.

A method of lubricating a recording medium is also provided in accordance with an embodiment of the present invention. The method comprises the steps of providing a substrate including a recording layer and depositing a lubricating layer onto the recording layer. The lubricating layer comprises fluorinated carbon and a thermally stabilizing dopant.

Also provided in accordance with an embodiment of the present invention is a lubricated article comprising a substrate and a lubricant disposed upon the substrate. The lubricant comprises fluorinated carbon and a dopant selected from the group consisting of N and $SiO_2$.

DETAILED DESCRIPTION

Figure 1:
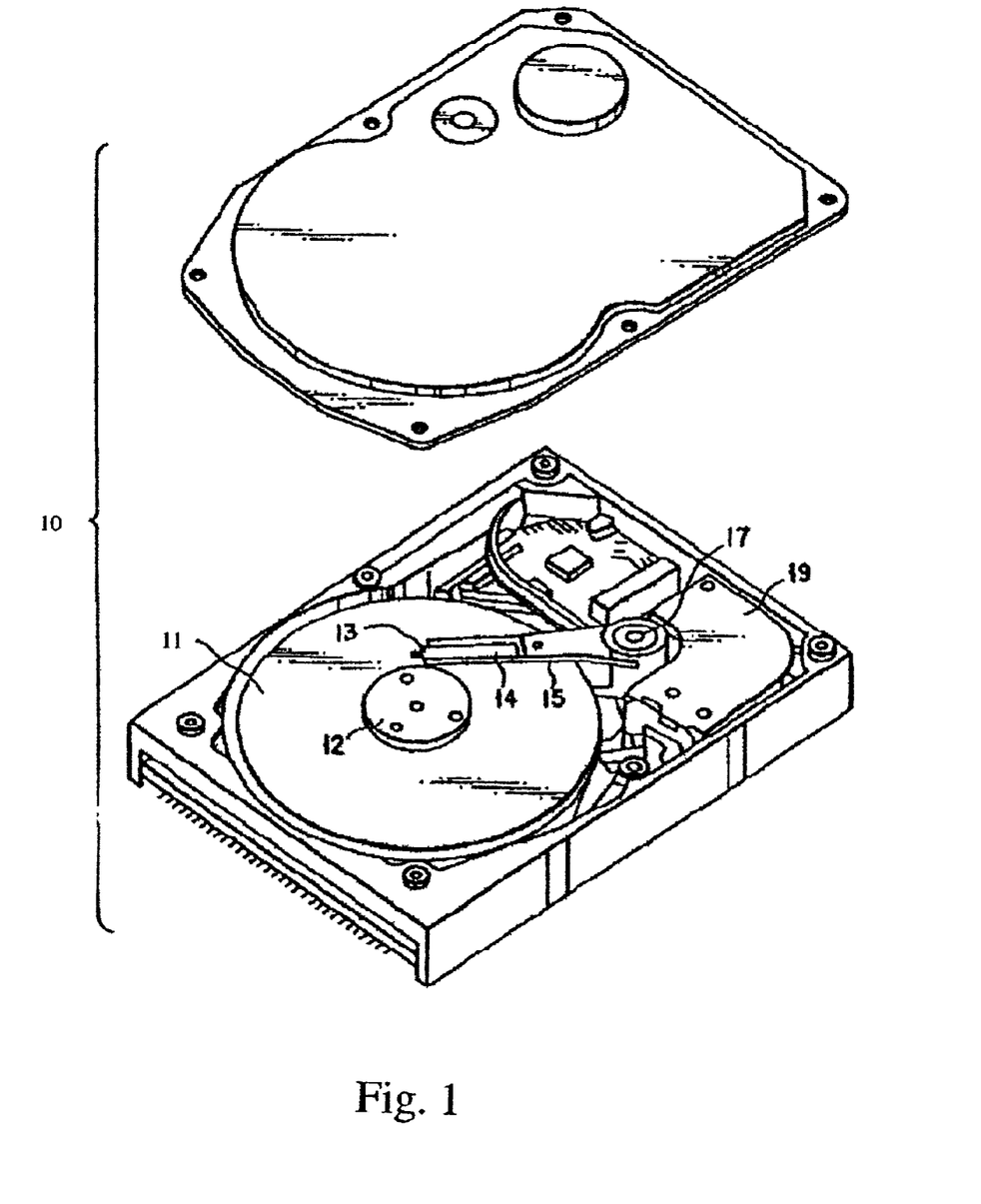
FIG. 1 is a perspective view of a magnetic disc drive.

FIG. 1 shows a schematic arrangement of a magnetic disc drive 10 using a rotary actuator. A disc or medium 11 is mounted on a spindle 12 and rotated at a predetermined speed. As more fully described below, the medium 11 includes a doped lubricating layer in accordance with the present invention. The rotary actuator comprises an arm 15 to which is coupled a suspension 14. A magnetic head 13 is mounted at the distal end of the suspension 14. The magnetic head 13 may contact the recording/reproduction surface of the disc 11. The rotary actuator could have several suspensions and multiple magnetic heads to allow for simultaneous recording and reproduction on and from both surfaces of each medium. A voice coil motor 19 as a kind of linear motor is provided to the other end of the arm 15. The arm 15 is pivotably supported by ball bearings (not shown) provided at the upper and lower portions of a pivot position 17.

Figure 2:
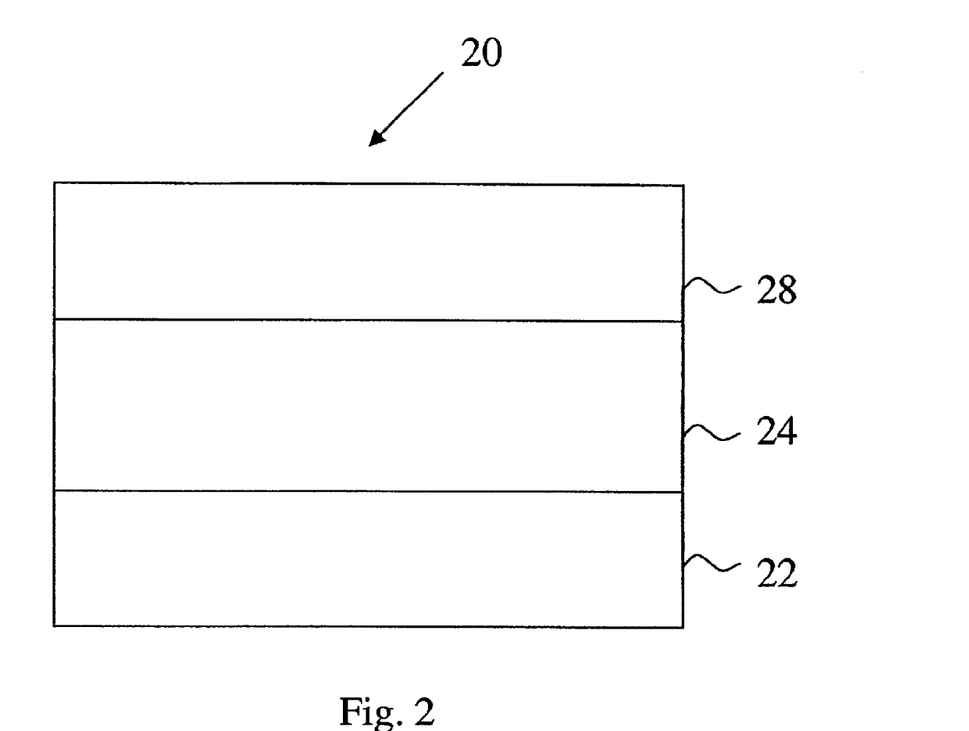
FIG. 2 is a schematic view of a portion of a recording medium including a substrate, a recording layer and a lubricating layer in accordance with an embodiment of the present invention.

FIG. 2 illustrates a recording medium 20 utilizing a lubricating layer 28 in accordance with an embodiment of the present invention. The recording medium 20 comprises a substrate 22, a recording layer 24, for instance, a magnetic recording layer, disposed on the substrate 22 and a lubricating layer 28 disposed on the recording layer 24.

The substrate 22 may be made of any suitable material known in the art, such as a glass, a glass/ceramic, NiP/Al, a metal alloy, a plastic/polymer material, a ceramic, a glass-polymer, a composite material or other non-magnetic materials. Suitable materials for the recording layer 24 include multilayers of Co/Pd or Co/Pt, LIO phases of CoPt or FePt, hcp Co alloys, CoB/Pd, CoCr/Pd, CoCrB/Pd multilayers and ferrites. The recording layer 24 may have a thickness of from about 2.5 nm to about 50 nm, for example from about 5 nm to about 20 nm.

The lubricating layer 28 comprises a film of a-C:F,H and a thermally stabilizing dopant or dopant incorporated into the film. As used herein, the term "thermally stabilizing dopant" includes any dopant that effectively increases the thermal stability of the a-C:F,H film. The term "thermal stability," as used herein, indicates the relative rate of degradation of the film at an elevated temperature compared to the rate of degradation of an undoped film at the same temperature. The dopant increases the thermal stability of the film such that it reduces or eliminates degradation of the lubricant at a peak operating temperature of the lubricating film, for example, at temperatures of 100 to 250° C. to 300° C. or higher. For thermally assisted magnetic recording media, peak temperatures of about 200, 250 or 300° C. or higher may be reached.

Suitable dopants include nitrogen and compounds containing N, for example, $NH_3$, silicon and compounds containing Si, for example Si, $SiO_2$, and $SiH_4$. For example, the dopant comprises N or $SiO_2$. The dopant is provided in a sufficient amount to increase the thermal stability of the lubricating layer. For example, the dopant may be present in the lubricating layer 28 in an amount of from about 3 atomic % to about 13 atomic % of the lubricating layer 28, for instance, higher than 10 atomic %. Since the lubricating layer 28 decreases the coefficient of friction between the read/write head and the recording layer 24, the type and amount of the dopant, selected from the above-listed acceptable types and amounts, typically will not significantly increase the coefficient of friction relative to an un-doped film (as illustrated in the Example). Therefore, the lubricating layer 28 also exhibits the increased wear resistance exhibited by an un-doped film.

The lubricating layer 28 is typically thick enough to protect the recording layer 24, yet not thick enough to interfere with the operation of the read/write head. The lubricating layer may have a thickness of between 1 nm and 10 nm, for example, between 1 nm and 5 nm.

Figure 3:
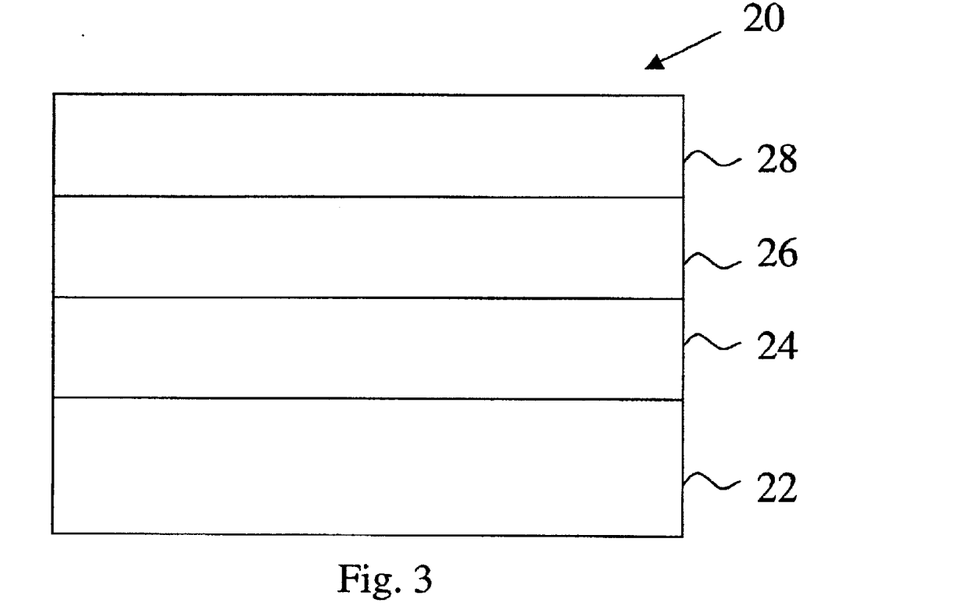
FIG. 3 is a schematic view of a portion of a recording medium including a substrate, a recording layer, a lubricating layer and a buffer layer in accordance with an embodiment of the present invention.

The recording medium 20 may optionally include a buffer layer 26 disposed between the recording layer 24 and the lubricating layer 28, as illustrated in FIG. 3. The buffer layer 26 may be any suitable material that effectively inhibits migration of fluorine from the lubricating layer 28 to the recording layer 24. The buffer layer 26 may also serve to increase the adhesion of lubricating layer 28 to the recording layer 24. Suitable materials for the buffer layer 26 include a-C:H, a-C:N, a-C:H, N, SiC, and $B_4C$, as well as other materials known to those in the art. The buffer layer 26 for example, has a thickness of from about 0.5 to 3 nm.

Figure 4:
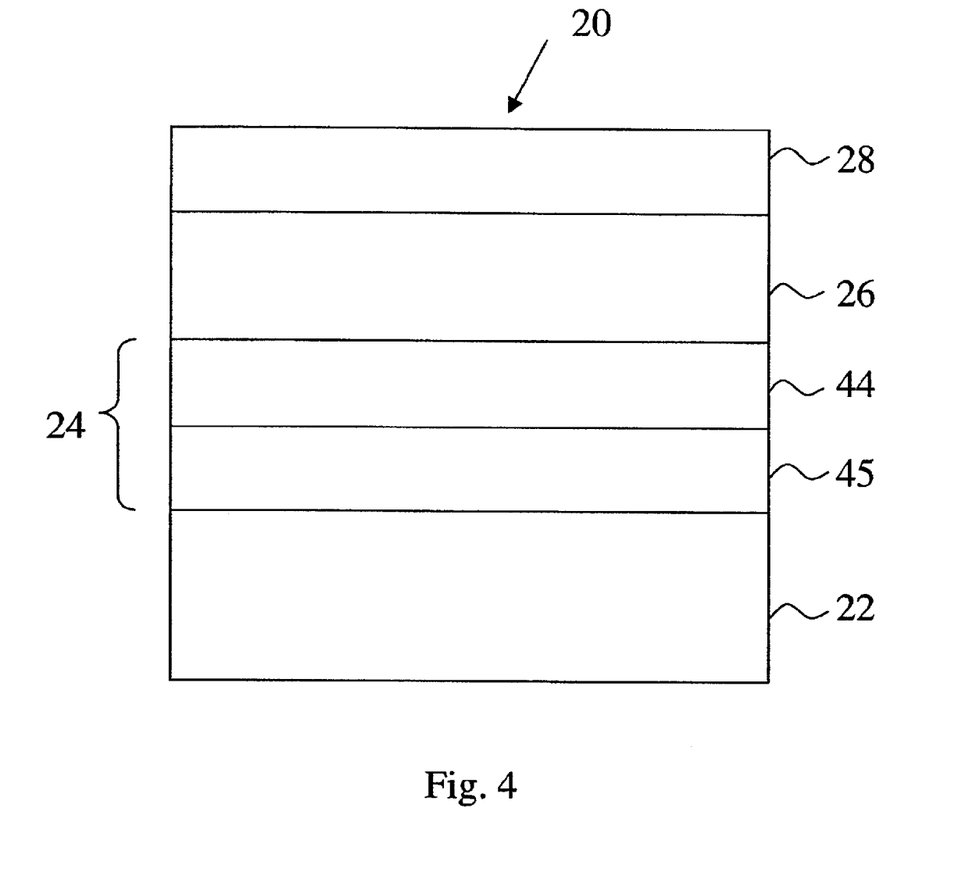
FIG. 4 is a schematic view of a portion of a recording medium including a substrate, a hard magnetic recording layer, a soft magnetic recording layer, and a lubricating layer in accordance with the present invention.

In the embodiment illustrated in FIG. 4, the recording layer 24 comprises a hard magnetic recording layer 44. A soft magnetic layer 45 is also included in this embodiment, and is disposed between the hard magnetic recording layer 44 and the substrate 22. The hard magnetic recording layer 44 may comprise multilayers of Co/Pd or Co/Pt, L10 phases of CoPt or FePt, hcp Co alloys, CoB/Pd, CoCr/Pd, CoCrB/Pd multilayers and ferrites. The soft magnetic layer 45 may comprise FeCoB, FeCoZr or NiFe. In this embodiment, the recording medium 22 is particularly suitable for use with a perpendicular recording head. However, the recording medium 22 is also suitable for use with a longitudinal recording head.

In another embodiment, the recording layer 24 may comprise a magneto-optical ci layer. Suitable materials for the recording layer 24 in this case include Co/Pt, Co/Pd multilayers, and PdCo alloy/noble metal (Pd, Pt, or Cu) multilayers.

Those skilled in the art will realize that the lubricant of the present invention may be used with any recording medium that requires the read/write mechanism to be in close contact with the recording medium. As such, the lubricant of the present invention may be used with magnetic recording media, thermally assisted magnetic recording media, optically assisted recording media, optical recording media, and magneto-optical recording media.

A method of lubricating the recording medium 20 is also provided in accordance with the present invention. The method includes providing the substrate 22 and the recording layer 24, and depositing the lubricating layer 28 onto the recording layer 24. The lubricating layer 28 includes a thermally stabilizing dopant as described above. Methods for depositing the lubricating layer 28 on the recording layer 24 include plasma-enhanced chemical vapor deposition (PECVD), magnetron sputtering, ion beam deposition, laser ablation, electron beam evaporation, and chemical vapor deposition (CVD). For instance, the lubricating layer 28 is deposited by PECVD, sputtering or ion beam deposition.

Figure 6:
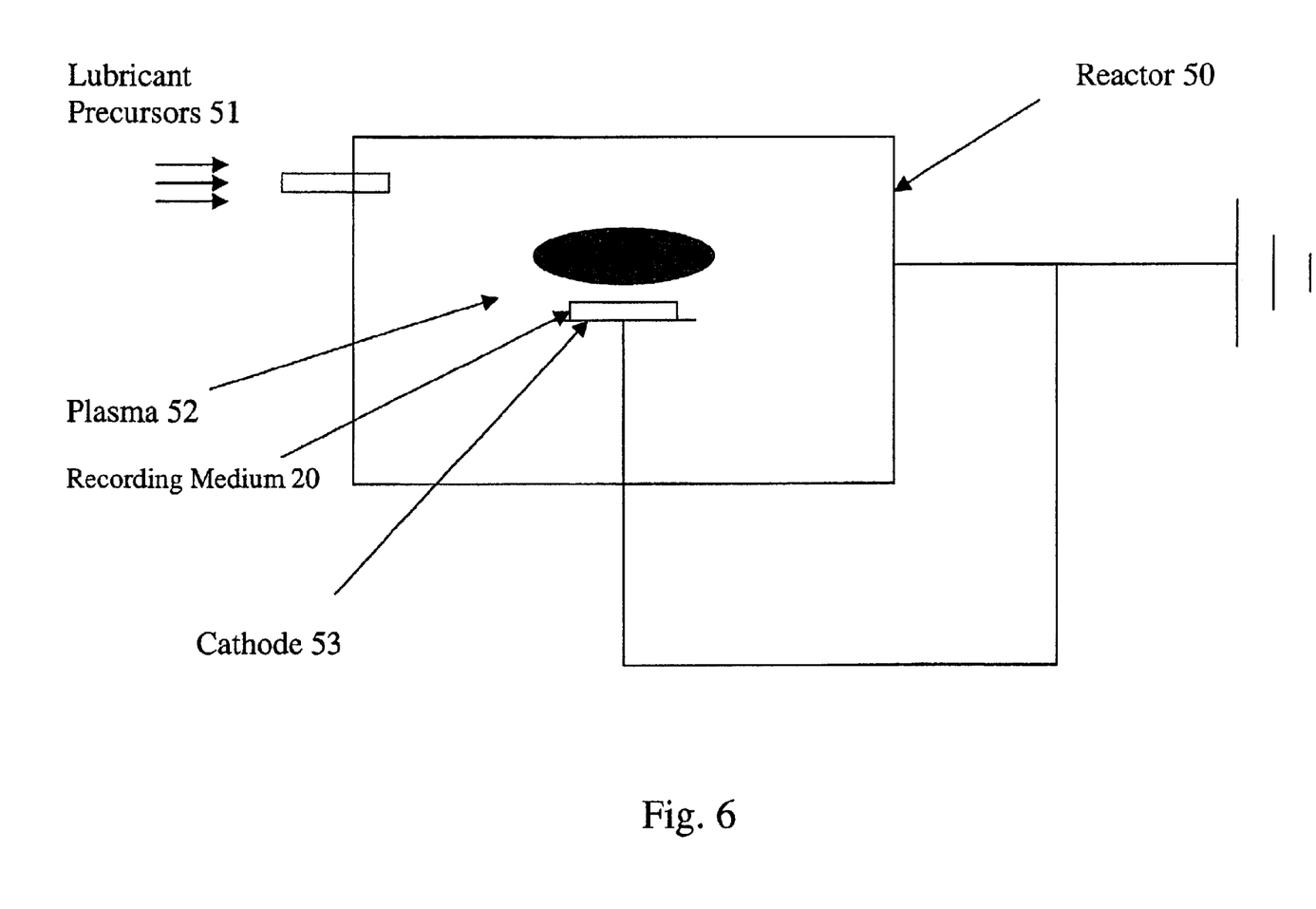
FIG. 6 is a schematic view of an apparatus for the deposition of the lubricating layer according to an embodiment of the invention.

If PECVD is used, after recording layer 24 is deposited onto the substrate 22, the recording medium 20 is loaded into a reactor 50 and electrically connected to the cathode 53. After the reactor 50 is pumped to a preset negative pressure, a suitable mixture of lubricant precursors or reactant gases 51 is allowed to flow into the reactor 50. The Bus lubricant precursors 51 may include $CH_4$, $C_2H_2$, $C_6H_6$ (linear or cyclic hydrocarbon gas), $CF_4$, $C_2F_6$, $C_6F_6$, and $C_6HF_5$ (linear or cyclic fluorocarbon gas).

The thermally stabilizing dopant is included as part of the lubricant precursors 51, and may be provided in the form of $N_2$, $NH_3$, $SiH_4$, $Si_2H_6$, $O_2$ and the like. The thermally stabilizing dopant is present in the lubricant precursors 51 in an amount from about 5 to 60%, for example, from about 20 to about 40% of the total flow rate (i.e. vol. %) of the lubricant precursors 51, typically measured in $cm^3/min$.

As the lubricant precursors 51 flow into the reactor 50, the pressure inside the reactor 50 is controlled at a desirable value e.g., between about 2 and 20 mTorr, for instance, between about 5 and 15 mTorr. An RF power is then applied to the cathode 53 of the reactor 50 to ignite a plasma 52 such that the recording medium 20 becomes negatively biased relative to ground or to other parts of the reactor 50. The recording medium 20 is kept in the plasma 52 until the required thickness of the lubricating layer 28 is obtained. The lubricating layer 28 may have a thickness of from about 1 nm to about 10 nm, for instance, about 1 nm to about 5 nm.

A similar solid lubricant can be deposited using magnetron sputtering in a vacuum system. Graphite may be used as the target material. Prior to deposition, the system is evacuated to base pressure of about $10^{-8}$ Torr. Before sputtering, the total pressure is kept at about 5–15 mTorr, consisting of argon and desirable fluorocarbon gas such as $CF_4$, $C_2F_6$, $C_6F_6$, $C_6F_5H$, and reactive gas consisting of dopant elements such as $N_2$, $NH_3$ and/or $SiH_4$. The partial pressure of these reactive gases may be in the range of about 5–60%, for example, about 20–40%. For Si dopant, the lubricant can also be deposited by co-sputtering graphite and Si, or $SiO_2$ targets simultaneously using the similar combination of gas mixture as described above.

EXAMPLE

Figure 5:
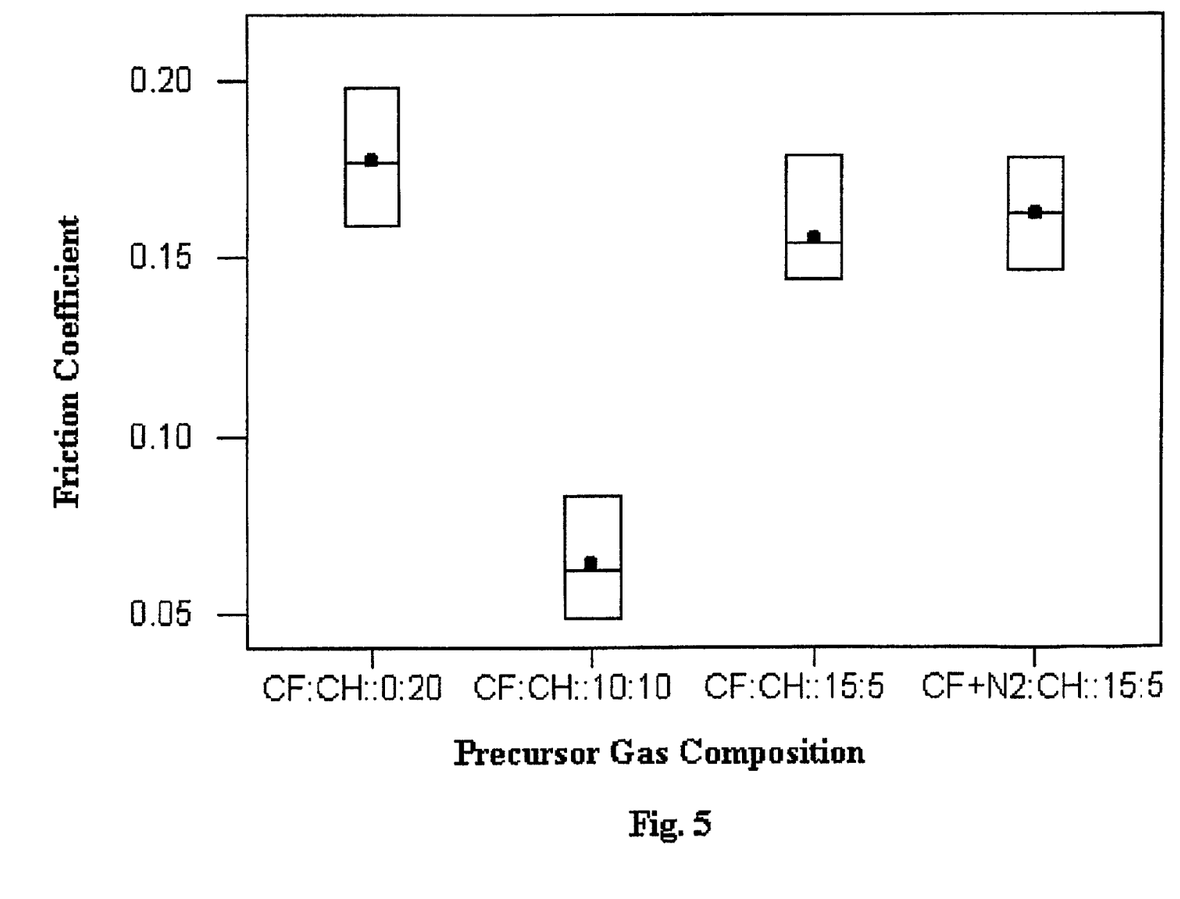
FIG. 5 is a graph illustrating the effect of the use of N as a thermally stabilizing dopant on the coefficient of friction between the read/write head and the recording layer.

Films were deposited on Si substrates using the above-described PECVD method and were mounted on a pin-on-disc tribology tester. The tester was a Tri, Inc. tribology test spinstand model T1000C. The tester rigidly held the pin, a WC sphere mounted on the end of an arm. The Si wafer was mounted on the spindle base with the surface normal aligned with the loading direction of the pin. The test apparatus and test procedure conformed to ASTM standard G99–95a, "Standard Test Method for Wear Testing with a Pin-on Disk Apparatus." The pin material was a 1/8" diameter WC sphere that contacted the film with an applied normal force of 0.25 gf. The sample was rotated at a speed of 60 rpm for 70 seconds. Friction was measured using a calibrated strain gauge, with readings acquired at a rate of 10 Hz for 70 seconds. These readings were averaged to give a single friction force value. This process was repeated at several different radii on several different samples for each lubricating layer tested. FIG. 5 shows the comparison of the lubricating layers, all at a thickness of 20 Å. A coefficient of friction between 0.05 and 0.22 was measured for four different lubricating layers. Three of the lubricating layers did not include a dopant, while the fourth included N as the thermally stabilizing dopant. The three lubricating layers that did not include a dopant were deposited using the above-described PECVD method. During deposition, the lubricant precursors had a flow rate ratio of $CF_4:CH_4$ (labeled in FIG. 5 as CF:CH) of 0:20 (a-C:H layer), 10:10, and 15:5 (a-C:H,F layer). The lubricating layer that included the dopant was deposited using the PECVD method with lubricant precursors having a flow rate ratio of $CF_4+N_2:CH_4$ ratio of 15:5 (labeled in FIG. 5 as $CF+N_2:CH$). For the lubricant layer that included the dopant, the flow rate ratio of $CF_4:N_2$ was 1:1. As can be seen, the average coefficient of friction for the lubricating layer deposited using a lubricant flow rate ratio of $CF_4+N_2:CH$ of 15:5 was not significantly higher than the undoped layer deposited using a flow rate ratio of $CF_4:CH_4$ of 15:5. Thus, the wear resistance of the doped lubricating layer is substantially the same as the wear resistance of the un-doped a-C:F,H.

In addition to recording media, the present doped lubricating layer may be deposited on other types of substrates. The substrate may be any material that requires lubrication in a situation where the lubricant may be exposed to elevated temperatures. Such substrates may include ball bearings, precision tools and Micro-Electro-Mechanical Systems (MEMS).

Whereas particular embodiments of this invention have been described above for purposes of illustration, it will be evident to those skilled in the art that numerous variation of the detail of the present invention may be made without departing from the invention as defined in the appended claims.

What is claimed is:

1. A recording medium comprising:
   a substrate;
   a recording layer disposed on the substrate; and
   a lubricating layer disposed on the recording layer, wherein the lubricating layer comprises fluorinated carbon and a thermally stabilizing dopant comprising N.

2. The recording medium of claim 1, wherein the thermally stabilizing dopant is present in an amount of at least 3 atomic % of the lubricating layer.

3. The recording medium of claim 1, wherein the thermally stabilizing dopant is present in an amount from about 10 atomic % to about 13 atomic %.

4. The recording medium of claim 1, wherein the thermally stabilizing dopant comprises a compound containing N.

5. The recording medium of claim 4, wherein the thermally stabilizing dopant comprises $NH_3$.

6. The recording medium of claim 1, wherein the thermally stabilizing dopant further comprises Si.

7. The recording medium of claim 1, wherein the thermally stabilizing dopant further comprises a Si-containing compound.

8. The recording medium of claim 7, wherein the compound containing Si is selected from the group consisting of SI, $SiO_2$ and $SiH_4$.

9. The recording medium of claim 1, wherein the lubricating layer is thermally stable above a temperature of 250° C.

10. The recording medium of claim 1, wherein the lubricating layer is thermally stable at a temperature of 300° C.

11. The recording medium of claim 1, further comprising a buffer layer disposed between the recording layer and the lubricating layer.

12. The recording medium of claim 11, wherein the buffer layer comprises a material selected from the group consisting of a-C:H, a-C:N, a-C:H, a-C:H, N, SiC and $B_4C$.

13. The recording medium of claim 1, wherein the recording layer is an optical recording layer.

14. The recording medium of claim 1, wherein the recording layer is a hard magnetic recording layer.

15. The recording medium of claim 14, wherein the recording medium further comprises a soft magnetic layer under the hard magnetic recording layer.

16. The recording medium of claim 1, wherein said recording layer is a magneto-optical recording layer.

17. The recording medium of claim 1, wherein the recording medium is a thermally assisted magnetic recording medium.

18. The recording medium of claim 1, wherein the recording medium is an optically assisted magnetic recording medium.

19. The recording medium of claim 1, wherein the lubricating layer has a thickness of from 1 to 5 nm.

20. The recording medium of claim 1, wherein the lubricating layer has a thickness of less than 10 nm.

21. A lubricated article comprising a substrate and a lubricant disposed on the substrate, wherein the lubricant comprises fluorinated carbon and a dopant comprising N.

22. The lubricated article of claim 21, wherein the dopant is present in an amount from about 3 atomic % to about 13 atomic % of the lubricant.

23. The lubricated article of claim 21, wherein the lubricating layer has a thickness of from 1 to 5 nm.

24. The lubricated article of claim 21, wherein the lubricating layer has a thickness of less than 10 nm.

25. A method of magnetic recording comprising:
   providing a magnetic recording head;
   providing a magnetic recording medium; and
   moving the magnetic recording medium in relation to the head to thereby record data, wherein the magnetic recording medium comprises a lubricating layer including fluorinated carbon and a thermally stabilizing dopant comprising N.

26. The method of magnetic recording of claim 25, wherein the thermally stabilizing dopant further comprises $SiO_2$.

27. The method of magnetic recording of claim 25, wherein the lubricating layer is thermally stable at a temperature above 250° C.

28. The method of magnetic recording of claim 25, wherein the lubricating layer is thermally stable at a temperature of 300° C.

29. The method of the claim 25, wherein the lubricating layer has a thickness of from 1 to 5 nm.

30. The method of claim 25, wherein the lubricating layer has a thickness of less than 10 nm.

* * * * *

UNITED STATES PATENT AND TRADEMARK OFFICE
CERTIFICATE OF CORRECTION

| | | |
|---|---|---|
| PATENT NO. | : 6,764,757 B1 | Page 1 of 1 |
| APPLICATION NO. | : 09/901802 | |
| DATED | : July 20, 2004 | |
| INVENTOR(S) | : Mei-Ling Wu and James Dillon Kiely | |

It is certified that error appears in the above-identified patent and that said Letters Patent is hereby corrected as shown below:

Column 3, Line 2, "LIO" should read -- L10 --

Column 4, Line 2, Delete "ci"

Column 4, Line 32, Delete "Bus"

Column 4, Line 38, Insert a space between "$O_2$" and "and"

Column 5, Line 3, "TrI, Inc." should read -- TTi, Inc. --

Column 5, Line 50, "variation" should read -- variations --

Column 5, Line 51, "detail" should read -- details --

Column 6, Line 5, Delete comma between "stabilizing" and "dopant"

Column 6, Line 13 (Claim 8)
"SI" should read -- Si --

Column 6, Line 25, (Claim 12)
Delete "a-C:H" (second occurrence)

Signed and Sealed this

Thirteenth Day of February, 2007

JON W. DUDAS
*Director of the United States Patent and Trademark Office*